United States Patent [19]

Itoh

[11] Patent Number: 4,956,631
[45] Date of Patent: Sep. 11, 1990

[54] FAULT DETECTOR FOR VEHICLE SAFETY SYSTEM

[75] Inventor: Hisatsugu Itoh, Hyogo, Japan

[73] Assignee: Mitsubishi Denki Kabushiki Kaisha, Tokyo, Japan

[21] Appl. No.: 410,874

[22] Filed: Sep. 22, 1989

[30] Foreign Application Priority Data

Mar. 20, 1989 [JP] Japan .................................. 1-66071

[51] Int. Cl.$^5$ .............................................. B60Q 1/00
[52] U.S. Cl. .................................. 340/436; 280/735
[58] Field of Search ................... 340/438, 436, 425.5; 280/734, 735; 307/10.1

[56] References Cited

U.S. PATENT DOCUMENTS

| | | | |
|---|---|---|---|
| 3,745,523 | 7/1973 | Lewis et al. | 340/438 |
| 3,767,002 | 10/1973 | Gillund | 340/438 |
| 3,803,569 | 4/1974 | Iwasaki et al. | 340/214 |
| 4,287,431 | 9/1981 | Yasui et al. | 307/10 |
| 4,359,715 | 11/1982 | Langer et al. | 340/438 |
| 4,673,912 | 6/1987 | Kumasaka et al. | 340/438 |

FOREIGN PATENT DOCUMENTS 61-57219 12/1986 Japan .

*Primary Examiner*—Joseph A. Orsino
*Assistant Examiner*—Frank M. Scutch, III
*Attorney, Agent, or Firm*—Burns, Doane, Swecker & Mathis

[57] ABSTRACT

An improved fault detector for a vehicle air bag safety system including a balanced wheatstone bridge having a squib resistor at one arm thereof and a G sensor at another arm thereof. Wherein, outputs of the wheatstone bridge are fed alternatively to a single DC amplifier circuit by utilizing switching circuits and a voltage difference of the alternative outputs derived from the DC amplifier circuit is measured for detecting any transition or a fault of the squib resistor without any influence of the input offset voltage for the DC amplifier circuit and of dispersions in circuit constant as well as components of a measuring system, thereby eliminating the precise adjustments which are required in the prior art system during the production stage for providing an inexpensive and highly reliable fault detector.

13 Claims, 3 Drawing Sheets

FAULT DETECTOR FOR VEHICLE SAFETY SYSTEM

BACKGROUND OF THE INVENTION

1. Field of the Invention

The present invention relates to a fault detector for a vehicle safety system, and more particularly to an inexpensive and highly reliable fault detector for a detecting a fault of a trigger resistor which is installed in a vehicle air bag system and the like.

2. Description of the Prior Art

Heretofore, a trigger heater having a relatively small resistance value called a "squib" has been used in a vehicle air bag system for expanding the air bag instantaneously upon a vehicle crash. The resistance of such a trigger resistor must be constantly monitored to determine whether it is normal or abnormal since the value of the trigger resistor relates to passenger safety.

JA. Pat. Publication No. 61-57219 shown as a block diagram in FIG. 3 is one of the fault detectors for vehicles in accordance with the prior art.

In the drawing of FIG. 3, element (1) is a battery or a DC power source installed in a vehicle, element (2) is an ignition switch connected to the DC power source (1) for the starting engine, element (3) is an acceleration sensor (hereinafter called a G sensor) connected to the DC power source (1) via the ignition switch (2) and consists of a parallel circuit of a normally open switch (31) and a resistor (32), and element (4) is the squib (the resistor to be checked) connected to the G sensor at a junction A for expanding the air bag and consisting of a series circuit together with the resistor (32) in G sensor (3).

Element (5) is another G sensor connected to the squib resistor (4) at a junction C and consists of a parallel circuit of a normally open switch (51) and a resistor (52) in the same way as G sensor (3) whereby the other end is grounded.

Circuit (6) is a fault detecting circuit connected to both ends of the squib resistor (4) as well as G sensors (3) and (5) for detecting a fault of the squib resistor (4) and is consisted of a DC differential amplifier circuit (7) connected to junctions A and C and a comparator circuit (8) connected to an output terminal of said differential amplifier (7).

The differential amplifier circuit (7) is comprised of resistors (71)–(74) for determining the gain thereof and an operational amplifier (75), whereby the resistor (71) is connected between junction A and a non-inverted input terminal of the operational amplifier (75), resistor (72) is connected between the ground and the non-inverted input terminal of the operational amplifier (75), the resistor (73) is connected between junction C and an inverted input terminal of the operational amplifier (75) and the resistor (74) is connected between the output terminal and the inverted input terminal of the operational amplifier (75) respectively.

The comparator circuit (8) is comprised of a series of connected resistors (81)–(83) for providing a standard voltage by dividing the voltage of DC power source (1), an operational amplifier (84) wherein the non-inverted input terminal is connected between a junction of resistors (81) and (82) and the inverted input terminal is connected to the output terminal of the operational amplifier (75), an operational amplifier (85) wherein the inverted input terminal is connected between a junction of resistors (82) and (83) and the non-inverted input terminal is connected to the output terminal of the operational amplifier (75), and an AND gate (86) for multiplying the outputs of the operational amplifiers (84) and (85). Further, element (9) is a warning lamp connected to the output terminal or the output terminal of the AND gate (86).

The operation of the prior art fault detector shown in FIG. 3 will now be described more in detail, wherein, the G sensors (3) and (5), the squib resistor (4) and a fault detector circuit are supplied power from the DC power source (1) simultaneously upon the closure of the ignition switch (2) for starting the engine of the vehicle and a voltage is generated across the squib resistor (4). The output voltage V1 of the DC power source (1) is then divided by the resistors (32) and (52) and the squib resistor (4).

In such an arrangement, since the resistance value R4 of the squib resistor (4) small while the resistance values R3 and R5 for resistors (32) and (52) are large and the output voltage V1 is approximately 12 V, the voltage difference Vac between the junctions A and C will be several 100 mV. For an example: if $$R3 = R5 = 1 k\Omega$$

$$R4 = 2\Omega$$

the voltage Vac across the squib resistor (4) will be:

$$\begin{aligned} Vac &= 12 \times 2/(1000 + 1000 + 2) \\ &= 12 \text{ mV} \end{aligned}$$

whereby, if the G sensor is shorted, the voltage Vac will be given by:

$$\begin{aligned} Vac &= 12 \times 2/(1000 + 2) \\ &= 24 \text{ mV} \end{aligned}$$

and, if the squib resistor (4) is shorted, the voltage Vac will be given by:

$$Vac = 0 \ V$$

Accordingly, in order to determine a fault based on a voltage that varies within a range of 0–10 mV, it is necessary to adjust the resistance values of resistors (71)–(74) to making the gain of the differential amplifier (75) to be 100 or so. With this adjustment, the output voltage V7 of the differential amplifier (7) will be 1.2 V in a normal condition and it will be 0 V if the squib resistor (4) is shorted.

Therefore, the resistors (81)–(83) in the comparator circuit (8) are adjusted so that the output voltages of the operational amplifiers (84) and (85) becomes "H" level when the output voltage V7 is normal (1.2 V), the output voltage of the operational amplifier (84) becomes "L" level time when either of G sensor (3) or (5) is abnormal by being shorted (2.4 V), and the output of the operational amplifier (85) becomes "L" level when the squib resistor (4) is shorted.

It is apparent from the foregoing that the output of the AND gate (86) becomes "H" level and the lamp (9) remains OFF while in normal condition, however, it becomes "L" level in the case of abnormal condition and the lamp (9) is turned ON to warn the driver of the abnormal condition.

If the vehicle crashes when the G sensors (3) and (5) and the squib resistor (4) are in their normal state, the normally open switches (31) and (51) will close, hence, the squib resistor (4) will generate heat to trigger the expansion of the air bag to protect the driver.

In the prior art fault detector, it has been necessary to set the gain of the DC differential amplifier circuit (7) to 100 or so in order to detect a voltage variation being caused by any fault. Therefore, the fault detector of the prior art has such problems as being weak for noise because of the high gain in amplification, which causes errors due to the input offset voltage of the amplifier if a DC differential amplifier is utilized and, moreover, it is necessary to install a precision amplifier which requires precise adjustments in the stages of production, hence, resulting in the loss of the reliability as well as increasing the cost.

SUMMARY OF THE INVENTION

It is, therefore, an object of the present invention to provide an inexpensive and highly reliable fault detector for solving the above stated problems.

According to the present invention, the problems experienced in the prior art fault detector are solved by the provision that outputs of a balanced wheatstone bridge are fed alternatively from junctions A and B to a single DC amplifier, a voltage difference of the alternative outputs of said DC amplifier is measured for detecting any transition of the squib resistor accurately without any influence of the input offset voltage for the DC amplifier circuit and of dispersions in circuit constant as well as components of a measuring system, and eliminating the precise adjusting during the production stage.

Accordingly, the fault detector of the present invention comprises:

a first series circuit consisting of a squib resistor and a resistor connected thereto at a junction A;

a second series circuit consisting of a pair of resistors connected to each other at junction B having the same resistance ratio as that of the first series circuit for providing a balanced wheatstone bridge with said first series circuit in parallel connection thereto;

a DC power source for supplying electric power to the wheatstone bridge;

a pair of switching circuits connected separately to the junctions A and B for alternative switching;

a DC amplifier circuit connected to a common output terminal of said switching circuits; and a judging circuit for determining the existence of a fault in the squib resistor based on the difference of the output voltages of the DC amplifier circuit being switched synchronously with the alternative switching of said switching circuits.

DESCRIPTION OF THE PREFERRED EMBODIMENT

Figure 1:
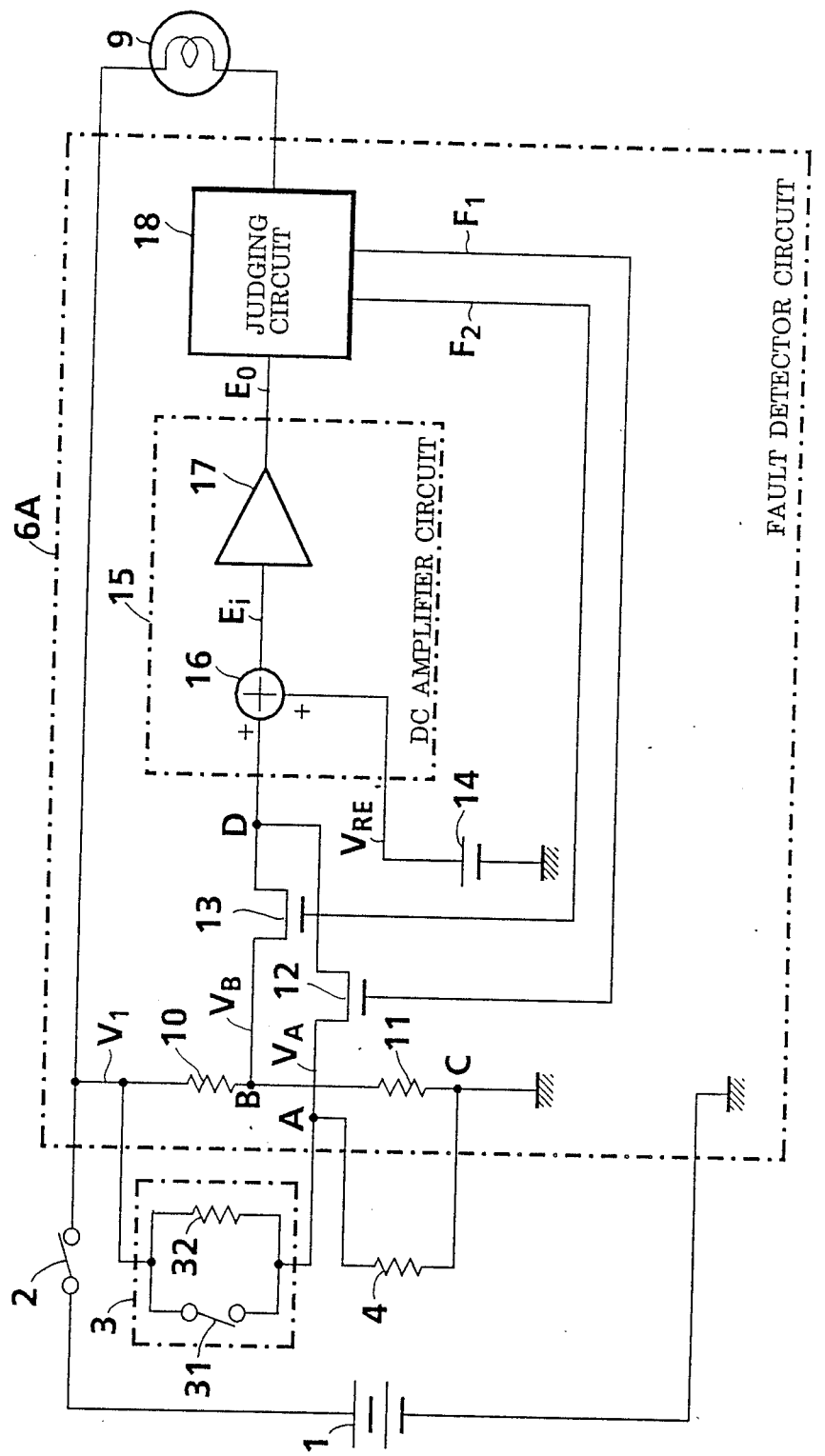
FIG. 1 is a block diagram of an embodiment of this invention.
Figure 3:
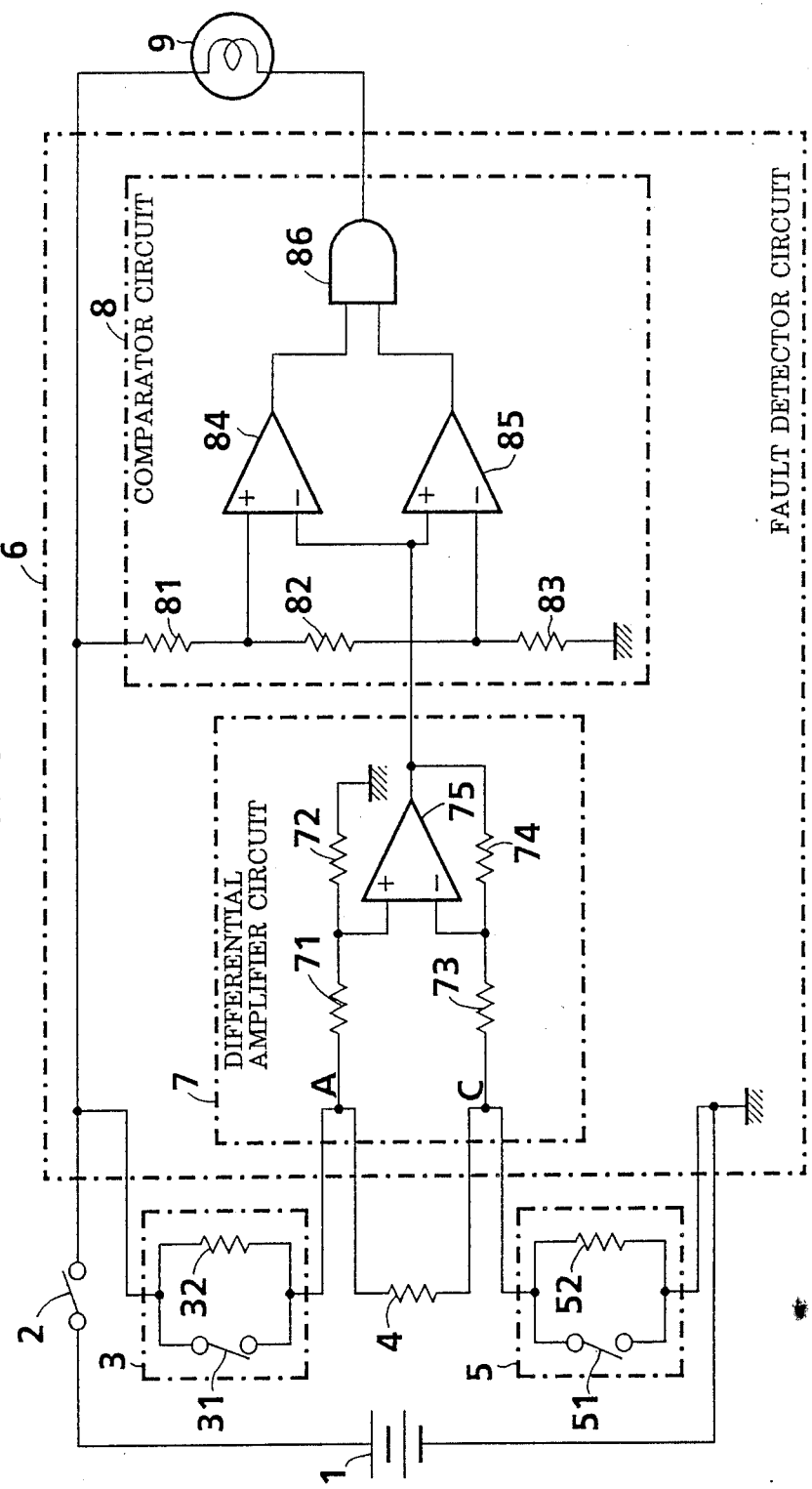
FIG. 3 is a block diagram of a known fault detector for detecting faults in air bag system.

Preferred embodiments will now be described in more detail with reference to the accompanying drawings. Referring to FIG. 1, a preferred embodiment of this invention is shown in block diagram. Block (6A) corresponds to the fault detector circuit (6) of the prior art shown in FIG. 3, elements (1)-(4) and (9) identify the like elements which are shown in FIG. 3, and the fault detecting circuit consists of the elements (10)-(18) which are illustrated in the following.

The second series circuit is provided with a pair of resistors (10) and (11) connected at the junction B, whereby the resistance valves R10 and R11 of the respective resistors (10) and (11) are adjusted so as to have the same resistance ratio with that of the first series circuit which consists of the resistor (32) and the squib resistor (4), and constitutes a balanced wheatstone bridge in parallel connection with the first series circuit.

Circuits (12) and (13) constitute a pair of switching circuits connected separately to the respective junctions A and B. Circuits (12) and (13) are made up of FET transistors and are turned on alternatively in operation. Element (14) is a standard electric power source which generates a standard reference voltage Vre.

Circuit (15) is a DC amplifier circuit connected to a common output terminal D for the switching circuits (12) and (13) as well as to the standard electric power source (14) at the inputs thereof and consists of an adder (16) for adding a voltage at the common output terminal D to the standard reference voltage Vre and an amplifier (17) for amplifying an input voltage Ei from the adder (16).

Circuit (18) is a judging circuit for detecting the existence of any fault based on the output voltage Eo of the amplifier (17), as an example, it is made up of a microcomputer which provides control signals F1 and F2 to switching circuits (12) and (13) for operating their gates and delivers a driving signal for turning on the lamp (9) when the fault is detected in the squib resistor.

The operation of the embodiment shown in FIG. 1 will now be described in more detail. If V1 is assigned as an output of the DC power source (1) and R3, R4, R10, R11 are the resistance values of the resistors (3), (4), (10) and (11), respectively, the voltages Va and Vb which are induced at the respective junctions A and B when the ignition switch is closed will be given by:

$$Va = V1 \, R4/(R3+R4) \qquad [1]$$

$$Vb = V1 \, R11/(R10+R11) \qquad [2]$$

wherein, if R4* is assigned the resistance value of the squib resistor (4) in normal condition, the deviated varied resistance value R4 is calculated from the normal resistance value R4* and the amount of resistance deviation ΔR4 will be given by:

$$R4 = R4^* + \Delta R4 \qquad [3]$$

since the resistance values R10 and R11 for the respective resistors (10) and (11) have been selected to have the same resistance ratio with that of the first series circuit when the squib resistor (4) is in normal condition, it will be given by:

$$R4^*/R3 = R11/R10 = \alpha \qquad [4]$$

where α is the resistance ratio. From the foregoing equations [1]-[4], the voltages Va and Vb at the junctions A and B are given by:

$$Va = [\alpha V1/(1+\alpha)](1+\Delta R4/R4^*) \qquad [5]$$

$$Vb = \alpha V1/(1+\alpha) \quad [6]$$

It is evident from the above equations [5] and [6], if $R4 = R4^*$ or $\Delta R4 = 0$, then $Va = Vb$.

When the switching circuit (12) is closed (ON) while the switching circuit (13) is open (OFF), the voltage Va induced at the junction A is fed to the DC amplifier circuit (15), hence, an input voltage Ei1 and an output voltage Eo1 of the amplifier (17) will become:

$$Ei1 = Va + Vre$$
$$Eo1 = G(Va + Vre) \quad [7]$$

where G is a gain of the amplifier (17). However, if the switching circuit (12) is open (OFF) and the switching circuit (13) is closed (ON), the voltage Vb induced at the junction B will be fed to the DC amplifier circuit (15), hence, the input voltage Ei2 and the output voltage Eo2 will be given by:

$$Ei2 = Vb + Vre$$
$$Eo2 = G(Vb + Vre) \quad [8]$$

The judging circuit (18) alternately receives the output voltages Eo1 and Eo2 being switched, by the operation of the switching circuits (12) and (13), synchronously with the switching timing thereof which provides a voltage difference $\Delta Eo$ by calculation. This voltage difference $\Delta Eo$ will be given by the following equation from the foregoing equations [5]-[8]:

$$\begin{aligned}\Delta Eo &= Eo1 - Eo2 \quad [9]\\ &= \alpha \, G \, V1 \, \Delta R4/(1 + \alpha)R4^*\end{aligned}$$

and this voltage difference $\Delta Eo$ is proportional to the resistance deviation $\Delta R4$. For example, if there is a resistance deviation $\Delta R4$ of $1\Omega$ when as $R3 = 1k\Omega$, $R4^* = 3\Omega$, $R10 = 100k\Omega$, $R11 = 300\Omega$, resistance ratio $\alpha = 3/1000$, $V1 = 10$ V and $G = 100$, then the voltage difference $\Delta Eo$ will be given by:

$$\begin{aligned}\Delta Eo &= 100(3/1000)/3(1 + 3/1000)\\ &\approx 0.997 \text{ V}\end{aligned}$$

from the foregoing equation [9]. Accordingly, it is clear from the above that the voltage difference $\Delta Eo \approx 1$ V corresponds to the deviation $\Delta R4 = 1\Omega$ of the resistance value R4 of the squib resistor (4). Further, from the equation [9], it is also clear that the voltage difference $\Delta Eo = 0$ V if the resistance deviation $\Delta R4 = 0\Omega$, and that the voltage difference $\Delta Eo = 0.1$ V if the resistance deviation $\Delta R4 = 0.1\Omega$, and these voltages have levels which can be handled in a conventional electronic circuit with enough margin.

In this case, the input voltage Ei to the amplifier (17) is compensated by supplying the standard voltage Vre from the standard voltage generator (14) to the adder (16) for adjusting the output voltage Eo of the DC amplifier (15) to fall within a voltage range of (0-5 V) wherein the difference in voltage can be detected by the judging circuit (18). It is needless to say that the voltage range mentioned above may vary depending on the semiconductors to be used in the judging circuit (18).

In the foregoing operation, the output voltage Eo1 given by the equation [7] varies correspondingly to the resistance value R4 of the squib resistor (4) and it is easy to detect an unusual value even if the variation exceeds said voltage range of 0-5 volts, so it is not critical for the voltage Eo1. However, the output voltage Eo2 given by the equation [8] is very important to the judging circuit whether it is within the said voltage range of 0-5 V at all times or not, therefore, the standard reference voltage Vre is provided for this purpose. Accordingly, if $G = 100$ like the previous example, the output voltage Eo2 will be given by:

$$Eo2 = 100(Vb + Vre)$$

from the equation [8] above, and then from the equation [1], the above equation will be given by:

$$Eo2 = 100[V1 \, R11/(R10 = R11) + Vre]$$

It is desirable to adjust this output voltage Eo2 to be an intermediate value of the other output voltage Eo1 or 2.5 V, so that an allowable range of the variation (allowance) will be around $2.5 \pm 1$ V. By considering the above, the following equation will be given:

$$1.5 \leq 100(0.003V1 + Vre) = 3.5 \quad [10]$$

Further, by considering that the standard voltage Vre is a sum of a fixed value of Vro and a co-variable voltage (0.003V1), the standard voltage Vre will be given by:

$$Vre = Vro - 0.003V1 \quad [11]$$

Then, from the equations [10] and [11] above, the condition to be fulfilled by the fixed voltage Vro will be given by:

$$15 \, mV \leq Vro \leq 35mV \quad [12]$$

where the above equation [12] may be transformed into:

$$Vro = 25mV \pm 10mV$$

It is easy to understand from the foregoing that the standard voltage Vre is a reasonable value to be afforded by the well known circuitry.

Figure 2:
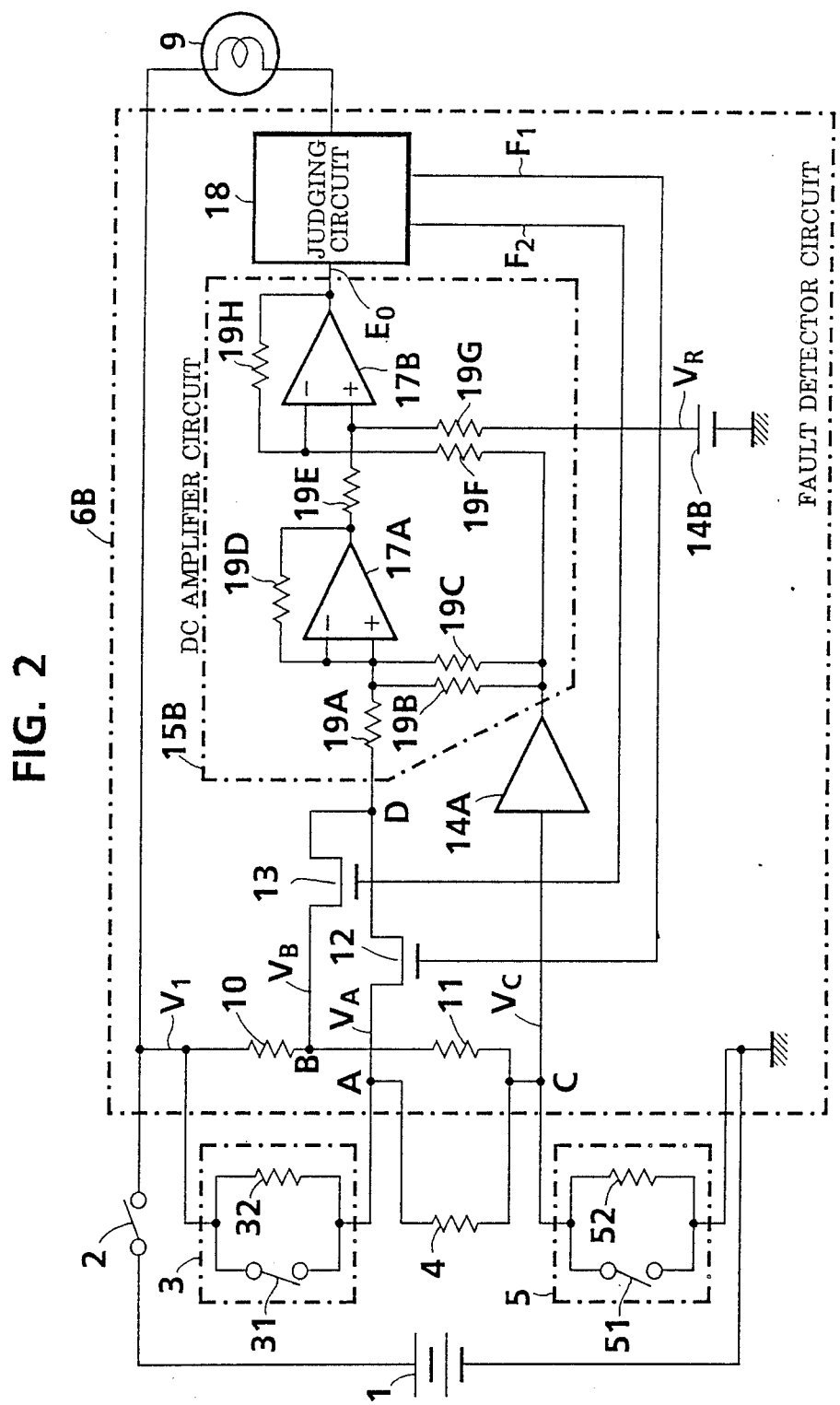
FIG. 2 is a block diagram of another embodiment of this invention.

Furthermore, in the above described embodiment, only one G sensor (3) has been employed, however, it should be noted that two G sensors (3) and (5), as it is shown in FIG. 2, can be employed for providing the same effect.

FIG. 2 shows another embodiment of this invention employing two G sensors, wherein, element (14A) is an amplifier having a gain of 1 which is connected to the junction C with an input thereof and provides a bias voltage for the DC amplifier circuit (15). Element (14B) is a standard voltage source for generating a standard voltage Vre and is arranged to provide an offset voltage to an output Eo of the DC amplifier circuit (15B). The standard voltage source (14) is installed in a fault detector circuit (6B) together with the amplifier (14A).

The DC amplifier circuit (15B) consist of operational amplifiers (17A) and (17B) and resistors (19A)-(19H). Wherein, the resistor (19A) is interposed between a common output terminal D and a non-inverted input terminal of the operational amplifier (17A), the resistor (19B) is interposed between an output terminal of the amplifier (14A) and the non-inverted input terminal of the operational amplifier (17A), the resistor (19C) is interposed between the output terminal of the amplifier (14A) and an inverted input terminal of the operational amplifier (17A), the resistor (19D) is interposed between an output terminal and the inverted input terminal of the operational amplifier (17A), the resistor (19E) is interposed between the output terminal of the operational amplifier (17A) and a non-inverted input terminal of the operational amplifier (17B), the resistor (19F) is interposed between the output terminal of the amplifier (14A) and the inverted input terminal of the operational amplifier (17B), the resistor (19G) is interposed between the standard voltage source (14B) and the non-inverted input terminal of the operational amplifier (17B), and the resistor (19H) is interposed between an output terminal and the inverted terminal of the operational amplifier (17B) respectively.

Where, if the resistance values for the resistors (19A)–(19H) are Ra–Rh and the relationship therebetween is given by:

$$Ra = Rc = Re = Rg = Rs \qquad [13]$$

$$Rb = Rd = Rf = Rh = Rp \qquad [14]$$

the output voltage Eo1 and Eo2 when the switching circuit (12) is closed will be given by:

$$Eo1 = Va(Rp/Rs)^2 + Vr + Vof \qquad [15]$$

$$Eo2 = Vb(Rp/Rs)^2 + Vr + Vof \qquad [16]$$

It will be noted that Vof is an offset voltage for the respective operational amplifiers (17A) and (17B) in equations [15] and [16] and includes error components caused by the deviations in resistors (19A)–(19H) in equations [13] and [14].

The difference voltage ΔEo in the output voltages is obtained by the calculation of the judging circuit (18) given by:

$$\begin{aligned} \Delta Eo &= Eo1 - Eo2 \qquad [17] \\ &= (Va - Vb)(Rp/Rs)^2 \end{aligned}$$

When the deivation ΔR4 of the resistor value is limited to a small amount, each voltage Va and Vb will be given approximately by:

$$Va = \alpha V1(1 + \Delta R4/R4^*)/2(1 + \alpha) \qquad [18]$$

$$Vb = \alpha V1/2(1 + \alpha) \qquad [19]$$

where R5 is the resistance value of the resistor (52), R3=R5>>R4, and R10>>R3. Accordingly, from equations [17]–[19], ΔEo will be given by:

$$\Delta Eo = \alpha V1(Rp/Rs)^2 \Delta R4/2(1+\alpha)R4^* \qquad [20]$$

when V1=20 V, R10=100 kΩ, R11=300Ω, Rp/Rs=10, and R4*=3Ω, the equation [20] will be:

$$\begin{aligned} \Delta Eo &= 3\Delta R4/R4^* \\ &= \Delta R4 \end{aligned}$$

accordingly, if ΔR4=0.1Ω then ΔEo=0.1 V. Therefore, the like sensitivity as the embodiment of FIG. 1 can be provided in this embodiment.

In the foregoing embodiments, the judging circuit (18) has provided the control signals F1 and F2 for switching the switching circuits (12) and (13), however, a timing signal may be fed to the switching circuits 12 and (13) and judging circuit (18) from an another circuit (not shown).

In the foregoing specification, the invention has been described with reference to the squib resistance (4) which is used as a trigger heater for the vehicle air bag system, however, it will be evident that any other type of resistor may be utilized if it has a relatively small resistance.

The present invention is not to be considered to be limited to the specific embodiments illustrated, various modifications may be made to adapt a particular situation or material to the teachings of this invention without departing from the essential scope thereof as set forth in the appended claims.

What is claimed is:

1. A fault detector for a vehicle safety system, comprising:
   a first series circuit having a squib resistor and a resistor connected thereto at a junction A;
   a second series circuit having a pair of resistors connected to each other at a junction B having the same resistance ratio as that of the first series circuit for providing a balanced wheatstone bridge with said first series circuit in parallel connection thereto;
   a DC power source for supplying electric power to the wheatstone bridge;
   a pair of switching circuits connected separately to the junctions A and B for alternative switching;
   a DC amplifier circuit connected to a common output of said switching circuits; and
   a judging circuit for determining existence of a fault in the squib resistor based on a difference of the output voltages of the DC amplifier circuit being switched synchronously with the alternative switching of said switching circuits.

2. A fault detector as defined in claim 1, wherein said first series circuit further includes a normally open switch connected in parallel to the resistor.

3. A fault detector as defined in claim 1, wherein said pair of switching circuits are switched by signals produced by the judging circuit.

4. A fault detector as defined in claim 1, wherein said DC amplifier includes an adder and an operational amplifier.

5. A fault detector as defined in claim 1, further including a standard voltage source to provide a standard voltage to said DC amplifier circuit.

6. A fault detector as defined in claim 1, further including a resistor connected in series to the lower potential end of the wheatstone bridge at a junction C.

7. A fault detected as defined in claim 6, further including a normally open switch connected in parallel to the resistor which is connected in series to the wheatstone bridge at the junction C.

8. A fault detector as defined in claim 6, wherein the DC amplifier circuit has a plurality of operational amplifiers and resistors.

9. A fault detector as defined in claim 8, wherein the DC amplifier circuit contains two operational amplifiers.

10. A fault detector as defined in claim 6, further including an amplifier interposed between the junction C and the DC amplifier circuit for providing a bias voltage thereto.

11. A fault detector as defined in claim 10, wherein the bias voltage is fed to the first stage of the DC amplifier circuit.

12. A fault detector as defined in claim 6, wherein the standard voltage is fed to the second stage of the DC amplifier circuit.

13. A fault detector as defined in claim 1 or claim 6, further including a lamp to indicate a fault.

* * * * *